United States Patent Office 3,424,808
Patented Jan. 28, 1969

3,424,808
DEHYDROGENATION AND METHANATION CATALYST AND PROCESS
Charles C. Brewer, Baton Rouge, La., Richard C. Fritz, Houston, Tex., and James M. Moe, Louisville, Ky.; said Brewer assignor to Foster Grant Co., Inc., Leominster, Mass., a corporation of Delaware, and said Fritz and said Moe assignors to Chemetron Corporation, Chicago, Ill., a corporation of Delaware
No Drawing. Filed Oct. 3, 1967, Ser. No. 672,454
U.S. Cl. 260—669  16 Claims
Int. Cl. C07c 15/10, 5/18

ABSTRACT OF THE DISCLOSURE

The disclosure relates to a catalyst consisting essentially of iron oxide and minor amounts of an alkali compound of an alkali metal, chromium oxide, and an oxide of another Group VIII metal; the method of production of the catalyst; and the use of the catalyst in the manufacture of olefinic compounds by the dehydrogenation of corresponding more saturated substances and the simultaneous conversion of oxides of carbon and hydrogen to methane.

---

This invention relates to an improved catalytic dehydrogenation process for the production of olefins. More particularly, this invention relates to the manufacture and composition of an improved catalyst consisting essentially of iron oxide, a minor amount of an alkali compound of an alkali metal, a minor amount of chromium oxide, and a minor amount of an oxide of another metal of Group VIII of the periodic system, preferably ruthenium, cobalt or nickel, and to the use of the catalyst in the production of olefinic compounds, such as styrene, butene, and butadiene, by catalytic dehyrogenation of the corresponding more saturated materials.

The production of olefins by catalytic dehydrogenation, such as the catalytic dehydrogenation of ethylbenzene to produce styrene, is an endothermic reaction and in order to keep the temperature within a suitable range, such as from about 1000° F. to about 1200° F. for the production of styrene, and about 1100° F. for the production of butadiene, it is the customary practice to mix superheated steam with the ethylbenzene feed and to introduce the steam-ethylbenzene feed into the catalyst bed which is at a temperature within that range. Steam also functions to lower the partial pressure of hydrogen which results in a shift of the ethylbenzenestyrene equilibrium to the styrene side. This requires the use of an amount of steam much larger than the amount normally required to purge the catalyst of any carbon formed by the water-gas reaction. The use of large amounts of steam is uneconomical and adds to the unit cost of styrene production. There are several additional disadvantages inherent in this method of keeping the temperature of the catalyst bed within the desired range. Uneven heating of the catalyst bed results from the use of an excess of steam as a heat carrier to prevent the dehydrogenation reaction from cooling the catalyst bed below the temperature range at which the dehydrogenation reaction satisfactorily takes place. In a conventional catalytic dehydrogenation, such as the catalytic dehydrogenation of ethylbenzene to styrene, in which steam is mixed with the ethylbenzene feed to keep the catalyst bed within the desired temperature range, it is necessary to keep the top of the catalyst bed at a temperature above the optimum temperature so that the rest of the bed is not cooled by the endothermic reaction to a temperature below the optimum for satisfactory dehydrogenation. This reduces the efficiency of the catalytic dehydrogenation reaction and results in the production of excess amounts of by-products, such as benzene and toluene.

It has now been discovered that the disadvantages of the prior art may be overcome and a more efficient process provided for the production of olefins, such as styrene, butene, and butadiene, by catalytic dehydrogenation of a corresponding more saturated substance, by the use of a catalyst which dehydrogenates the more saturated substance and converts the hydrogen from the dehydrogenation reaction and oxides of carbon which result from the water-gas reaction, or introduced carbon monoxide or carbon dioxide, or mixture thereof, to methane and water. The methanation reaction is exothermic and provides heat to assist in maintaining the catalyst bed at a temperature within the range at which the maximum amount of dehydrogenation is obtained. The temperature range is from about 570° F. to about 1200° F. for the dehydrogenation of ethylbenzene, butylene and butane. Therefore, less heat is required to be introduced so that the amount of steam which is introduced with the feed may be reduced to an amount approaching that required to remove by the water-gas reaction the carbon which is formed and deposited on the catalyst during the dehydrogenation reaction. The amount of steam is preferably not less than about two pounds of steam to one pound of hydrocarbon feed. The dehydrogenation reaction is conducted at a pressure of about one atmosphere. The methanation reaction has the added advantage that by the removal of hydrogen which results from the dehydrogenation reaction, the partial pressure of hydrogen is reduced and the ethylbenzene-styrene equilibrium is shifted to the styrene side. The water-gas reaction produces oxides of carbon which react with the hydrogen produced by the dehydrogenation reaction to produce methane. Oxides of carbon may be fed with the steam-ethylbenzene feed if the amount of oxides of carbon produced by the water-gas reaction is insufficient to consume all or substantially all of the hydrogen produced.

Iron catalysts are known to produce small yields of methane by the methanation reaction but are subject to heavy carbon deposition. The addition of steam to the reactant gas inhibits the formation of carbon but materially reduces the activity of iron catalysts. It has therefore been considered that iron catalysts are not good methanation catalysts. It is also known that reduced nickel catalyst are, in general, more active than iron catalysts and more specific than iron catalysts in that they produce only small yields of high molecular-weight hydrocarbons. However, nickel catalysts and particularly supported nickel catalysts have been found to rapidly lose their activity.

It has now been discovered that catalysts which overcome the disadvantages of the prior art and are suitable for use in the combined dehydrogenation and methanation reactions of this invention may be provided which are promoted dehydrogenation catalysts and consist essentially of iron oxide, a minor amount of an oxide of an alkali metal, preferably potassium oxide, a minor amount of chromium oxide, and a methanation promoter comprising a minor amount of an oxide of another Group VIII metal, preferably ruthenium, cobalt or nickel. The catalyst may also contain as a binding agent between about 5% and 30% by weight of a hydraulic cement, such a Portland cement or Portland cement clinker which contains free calcium oxide which is not chemically bound with aluminum or silica compounds. The amount of methanation promoter is within the range of from about 0.05 to about 10% of the combined weight of the iron oxide, alkali metal oxide, chromium oxide, and binder in the finished catalyst, depending upon the methanation promoter used and the method by which the catalyst is prepared.

The catalyst is prepared in two steps. In the first step, the base catalyst, which contains Portland cement or a Portland cement clinker as a binder, is prepared by mixing iron oxide, preferably pigment grade alpha iron oxide (Fe₂O₃), potassium carbonate (K₂CO₃), chromic oxide (Cr₂O₃), and Portland cement or Portland cement clinker, all materials being in finely divided form, and adding sufficient water to provide an extrudable plastic mass, which is then extruded in, preferably, ⅟₁₆ to ¼ inch diameter extrusions. The extrusions are dried for a short time, broken into short lengths, and calcined in air. Calcining may be accomplished by heating at a temperature of from about 600° C. to a temperature of about 750° C. for a period of from about three to twelve hours.

A base catalyst, in which a binder of Portland cement or Portland cement clinker is not present, may be prepared by a variety of methods which include mixing or co-grinding powdered iron oxide and chromium oxide, thermally decomposing a mixture of iron and chromium nitrates, coprecipitating hydrous oxides of iron and chromium, by mixing the hydrous gels or sols of iron and chromium, or by calcining a mixture of iron oxide powder and a decomposable chromium compound. A particularly suitable method is to co-grind or ball mill a mixture of powdered iron oxide and powdered chromium oxide and form a paste of this mixture with a solution containing the desired amount of alkali metal salt, preferably a potassium salt. The paste is extruded and the extrudate is dried and calcined at a temperature of from between about 700° C. and about 1000° C. and preferably between about 800° C. and about 900° C. for a period of from about five to about ten hours.

In the second step, a methanation promoter is added to the base catalyst by one of two methods. In the first method, the calcined base catalyst particles are impregnated on the surface by the use of a solution of a suitable water-soluble salt of the promoter. Impregnation in this manner may be accomplished by spraying the base catalyst particles with an aqueous solution of the water-soluble salt of the promoter, or by immersion of the base catalyst particles in an aqueous solution of the water-soluble salt of the promoter and then air drying and calcining. Calcining is accomplished by heating to a temperature within the range of from about 700° C. and about 1000° C. for a period of from about five to about ten hours. It is preferred that the finished catalyst prepared by this method contain an amount of promoter metal oxide within the range of from about 0.05% to about 1.0% by weight of the catalyst.

In the second method of adding the methanation promoter to the base catalyst, which is used when the promoter metal is nickel or cobalt, the shaped pellets or particles of the base catalyst are mulled with a suitable salt of the promoter metal, such as a nitrate or an organic salt, such as an acetate or a citrate. The cobalt or nickel salt is incorporated in the base catalyst by mulling in an amount such that after the mulled catalyst pellets are calcined, the amount of promoter metal oxide present in the finished catalyst is within the range of from about 0.4 to about 10% by weight of the catalyst. Calcining of the mulled catalyst is accomplished by heating to a temperature within the range of from about 700° C. to about 1000° C. for a period of from about 5 to about 10 hours. It is preferred that the finished catalyst prepared by this method contain an amount of promoter metal oxide within the range of from about 0.4% to about 10% by weight of the catalyst.

The base catalyst contains about 30% to about 80% of iron oxide, about 0.5% to about 10% of chromic oxide, and about 5% to about 40% of an alkali compound of an alkali metal. The base catalyst which contains a binder of Portland cement or Portland cement clinker, contains from about 5% to about 30% by weight of binder in addition to the other ingredients which are present. The amount of alkali metal, preferably potassium oxide, is not particularly critical and is preferably the amount provided by using between about 5% and 40% of alkali metal carbonate in the dry ingredient mixture before calcining. Naturally occurring iron oxide may be used but is is preferred to use pigment grade iron oxide, since such grades tend to be purer and are obtained in finely ground form suitable for mixing with the other ingredients of the base catalyst. A particularly preferred base catalyst contains about 58 parts of iron oxide, about 2.5 parts of chromic oxide, about 20.5 parts of potassium oxide, and about 19.0 parts of Portland cement.

The following examples illustrate more fully the preparation of the catalyst of this invention. In these examples, all parts and percentages are by weight.

EXAMPLE 1

A base catalyst, which contains a binding agent and is suitable for use in preparing the finished catalyst of this invention, is prepared by mixing 58.0 parts of pigment grade alpha iron oxide (Fe₂O₃), 30 parts of potassium carbonate (K₂CO₃), 2.5 parts of chromic oxide (Cr₂O₃), and 19.0 parts of Portland cement. All of the solids are finely divided prior to mixing and sufficient water is added so that the resulting plastic mass is in extrudable form. The plastic mass is extruded into ⅛ inch diameter extrusions, the extrusions are air dried for a short time, broken into ³⁄₁₆ inch pellets, and calcined in air at 750° C. for 12 hours.

EXAMPLE 2

A base catalyst in which a binding agent is not used is prepared by mixing 51.2 parts of pigment grade alpha iron oxide, 26.3 parts of potassium carbonate, and 2.5 parts of chromic oxide. All of the solids are finely divided prior to mixing and sufficient water is added to provide a plastic mass which is extrudable. The mass is extruded into ⅛ inch diameter extrusions and the extrusions are cut into pellets approximately ³⁄₁₆ inch in length. The pellets are dried for 8 hours at about 150° to 175° C. and then calcined at 900° C. for 12 hours.

EXAMPLE 3

A promoted catalyst, in accordance with this invention and for use in the process of this invention, is prepared by spraying an aqueous solution of nickel nitrate,

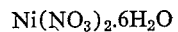

on the surface of calcined pellets prepared according to Example 1. The solution contains 9.78 grams of nickel nitrate and is sprayed on 998 parts of base catalyst. The sprayed base catalyst pellets are dried for eight hours at 110 C. and then calcined at 1200° C. for a period of twelve hours. The calcined catalyst contains 2.54 parts of nickel oxide, calculated as NiO.

EXAMPLE 4

A promoted catalyst is prepared in the same manner as the catalyst of Example 3 except that a solution containing 49.35 parts of nickel nitrate is sprayed on 990 parts of base catalyst. The calcined catalyst has 12.7 parts of nickel oxide, calculated as NiO.

EXAMPLE 5

A promoted catalyst is prepared according to the same procedure as that of Example 3 except that an aqueous solution containing 9.75 parts of cobalt acetate,

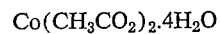

is sprayed on 998 parts of the base catalyst. The calcined catalyst contains 2.94 parts of cobalt oxide, calculated as CoO.

EXAMPLE 6

A promoted catalyst is prepared according to Example 3 except that an aqueous solution containing 1.05 parts of ruthenium chloride, RuCl₃, is sprayed on 999.5 parts of base catalyst. The calcined catalyst contains 0.58 part of ruthenium oxide, calculated as RuO.

EXAMPLE 7

A promoted catalyst is prepared by spraying an aqueous solution containing 9.87 parts of nickel nitrate, $$Ni(NO_3)2.6H_2O$$

on 998 parts of base catalyst prepared according to Example 2. The sprayed base catalyst pellets are dried for 8 hours at 110° C. and then calcined at 750° C. for a period of 12 hours. The calcined catalyst contains 2.54 parts of nickel oxide, calculated as NiO.

EXAMPLE 8

A promoted catalyst is prepared according to Example 7 except that a solution containing 40.3 parts of nickel nitrate is sprayed on 990 parts of base catalyst. The calcined catalyst contains 12.9 parts of nickel oxide, calculated as NiO.

EXAMPLE 9

A promoted catalyst is prepared according to Example 3 except that the nickel nitrate solution is sprayed on a base catalyst prepared according to Example 2.

EXAMPLE 10

A promoted catalyst is prepared according to Example 4 except that the nickel nitrate solution is sprayed on a base catalyst prepared according to Example 2.

EXAMPLE 11

A promoted catalyst, in accordance with this invention, is prepared by mulling 960 parts of base catalyst prepared according to Example 1 with 292.50 parts of cobalt acetate until mixing it thorough and then calcining at 700° C. for 12 hours. The calcined catalyst contains 88.20 parts of cobalt oxide, calculated as CoO.

EXAMPLE 12

A catalyst is prepared according to Example 11 except that 940 parts of base catalyst prepared according to Example 1 are mulled with 296.10 parts of nickel nitrate. The calcined catalyst contains 76.2 parts of nickel oxide, calculated as NiO.

EXAMPLE 13

A catalyst is prepared according to Example 11 except that a base catalyst is the catalyst prepared according to Example 2 is mulled with the cobalt acetate.

EXAMPLE 14

A catalyst is prepared according to Example 12 except that a base catalyst used is catalyst prepared as in Example 2 is mulled with the nickel nitrate.

The following examples illustrate the use of the catalyst of this invention in the dehydrogenation and methanation reaction.

EXAMPLE 15

A stream of steam and ethylbenzene feed, in which the ratio of steam to ethylbenzene feed is 2.7 to one pounds, is passed through the catalyst bed at the rate of 0.33 pound of ethylbenzene feed per hour per pound of catalyst. The stream fed into the reactor is at a temperature of 1140° F. at the inlet. The temperature of the catalyst bed during the run is 1110° F. one-fourth the distance from the top of the catalyst bed to the bottom, 1040° F. in the middle of the catalyst bed, 1050° F. three-fourths of the distance from the top of the catalyst bed to the bottom, and 970° F. at the outlet. The composition of the ethylbenzene feed is 0.1% benzene, 0.6% toluene, 97.4% ethylbenzene, and 4.7% styrene. The dehydrogenation product has a composition, as determined by gas chromatography, of 1.6% benzene, 5.1% toluene, 33.9% ethylbenzene, and 59.4% styrene.

EXAMPLE 16

A dehydrogenation run of ethylbenzene is made according to Example 15 except that the stream fed into the reactor is at a temperature of 1140° F. at the inlet. The temperature of the catalyst bed during the run is 1110° F. one-fourth the distance from the top of the catalyst bed to the bottom, 1080° F. in the middle of the catalyst bed, 1050° F. three-fourths of the distance from the top of the catalyst bed to the bottom, and 980° F. at the outlet. The composition of the ethylbenzene feed is 0.1% benzene, 1.0% toluene, 88.6% ethylbenzene, and 10.3% styrene. The dehydrogenation product has a composition, as determined by the gas chromatography, of 1.7% benzene, 5.8% toluene, 28.6% ethylbenzene, and 63.9% styrene.

EXAMPLE 17

A dehydrogenation run of ethylbenzene is made according to Example 15 except that the catalyst is prepared according to Example 6. The ratio of steam to ethylbenzene feed is three to one pounds and is fed at the rate of 0.41 pound of ethylbenzene feed per hour per pound of catalyst. The stream fed into the reactor is at a temperature of 1195° F. at the inlet. The temperature of the catalyst bed is 1160° F. at the top and 1110° F. at the bottom. The composition of the ethylbenzene feed is 0.24% benzene, 0.30% toluene, and 99.46% ethylbenzene. The composition of the dehydrogenation product, as determined by the gas chromatography, is 5.16% benzene, 2.7% toluene, 34.62% ethylbenzene, and 57.46% styrene.

EXAMPLE 18

A dehydrogenation run is made according to Example 15 except that the catalyst is prepared according to Example 6. The ratio of steam to ethylbenzene feed is three to one pounds and is fed through the catalyst bed at the rate of 0.41 pound of ethylbenzene feed per pound of catalyst. The stream fed into the reactor is at a temperature of 1195° F. at the inlet. The catalyst bed has a temperature of 1150° F. at the top and 1105° F. at the bottom. The composition of the ethylbenzene feed is 0.24% benzene, 0.30% toluene, and 99.46% ethylbenzene. The dehydrogenation product has a composition, as determined by gas chromatography, of 4.7% benzene, 2.5% toluene, 37.2% ethylbenzene, and 55.6% styrene.

EXAMPLE 19

A dehydrogenation run is made according to Example 15 except that the catalyst is prepared according to Example 6. The stream of steam and ethylbenzene feed has a ratio of four pounds of steam to one pound of ethylbenzene feed and is fed through the catalyst bed at the rate of 0.36 pound of ethylbenzene feed per hour per pound of catalyst. The stream fed into the reactor is at a temperature of 1180° F. at the inlet. The temperature of the catalyst bed is 1160° F. at the top and 1100° F. at the bottom. Carbon dioxide is injected with the stream of steam and ethylbenzene feed at the rate of 1.5 pounds of carbon dioxide per 100 pounds of ethylbenzene feed. The composition of the ethylbenzene feed is 0.2% benzene, 0.3% toluene, and 99.5% ethylbenzene. The dehydrogenation product has a composition, as determined by gas chromatography, of 2.5% benzene, 1.1% toluene, 43.3% ethylbenzene, and 53.1% styrene.

EXAMPLE 20

A dehydrogenation run is made according to Example 15 except that the catalyst is prepared according to Example 6. The ratio of steam to ethylbenzene in the feed is 3.6 pounds of steam to one pound of ethylbenzene feed and is passed through the catalyst bed at the rate of 0.39 pound of ethylbenzene feed per hour per pound of catalyst. Carbon dioxide is injected into the feed stream at the rate of 1.5 pounds of carbon dioxide per one hundred pounds of ethylbenzene feed. The temperature of the stream at the inlet is 1180° F. The temperature of the catalyst bed is 1150° F. at the top and 1090° F. at the bottom. The composition of the ethylbenzene feed is 0.2% benzene, 0.3% toluene, and 99.5% ethylbenzene. The dehydrogenation product has a composition, as determined by gas chromatography, of 2.0% benzene, 1.1% toluene, 52.3% ethylbenzene, and 44.6% styrene.

EXAMPLE 21

A dehydrogenation run is made according to Example 15 except that the catalyst is prepared according to Example 5. The ratio of steam to ethylbenzene feed is 4.5 pounds of steam to one pound of ethylbenzene feed and is passed through the catalyst bed at the rate of 0.37 pound of ethylbenzene feed per hour per pound of catalyst. The temperature of the stream at the inlet is 1130° F. The temperature of the catalyst bed is 1140° F. at the top and 1120° F. at the bottom. The composition of the ethylbenzene feed is 0.26% benzene, 0.86% toluene, 95.35% ethylbenzene, and 3.53% styrene. The dehydrogenation product has a composition, as determined by gas chromatography, of 1.9% toluene, 28.5% ethylbenzene, and 64.5% styrene.

The results of Examples 20 and 21 show that the injection of carbon dioxide into the stream of feed into the reactor suppresses toluene formation.

EXAMPLE 22

A dehydrogenation run is made according to Example 15 except that the catalyst is prepared according to Example 5. The ratio of steam to ethylbenzene in the feed is 3.2 pounds of steam to one pound of ethylbenzene feed and is passed through the catalyst bed at the rate of 0.48 pound of ethylbenzene feed per hour per pound of catalyst. The temperature of the feed is 1140° F. at the inlet. The temperature of the catalyst bed is 1200° F. at the top and 1190° F. at the bottom. The composition of the ethylbenzene feed is 0.79% benzene, 0.52% toluene, and 98.69% ethylbenzene. The dehydrogenation product has a composition, as determined by gas chromatography, of 2.0% benzene, 6.4% toluene, 19.8% ethylbenzene, and 71.8% styrene.

EXAMPLE 23

A dehydrogenation run is made according to Example 15 except that the catalyst is prepared according to Example 4. The stream of steam and ethylbenzene feed has a ratio of stream to ethylbenzene feed of 2.2 to one pounds and is passed through the catalyst bed at the rate of 0.39 pound of ethylbenzene feed per hour per pound of catalyst. The steam fed into the reactor is 1090° F. at the inlet. The temperature of the catalyst bed during the run is 1060° F. one-fourth of the distance from the top of tre catalyst bed to the bottom, 1050° F. in the middle of the catalyst bed, 1045° F. three-fourths of the distance from the top of the catalyst bed to the bottom, and 960° F. at the outlet. The composition of the ethylbenzene feed is 0.3% benzene, 0.6% toluene, 92.2% ethylbenzene, and 6.9% styrene. The dehydrogenation product has a composition, as determined by gas chromatography, of 1.9% benzene, 6.8% toluene, 24.0% ethylbenzene, and 67.3% styrene.

COMPARISON EXAMPLE

An ethylbenzene dehydrogenation run is made in the same manner as that of Example 15 except that the catalyst is prepared according to Example 1 and has a $Fe_2O_3$ content of 93%, a $CR_2O_3$ content of 5%, and a $K_2O$ content of 2%. The catalyst is in the form of pellets which are 1/8 inch in diameter and 3/16 inch in length. The ratio of steam to ethylbenzene feed is 2.2 pounds of steam per pound of ethylbezene feed and the stream is passed through the catalyst bed at the rate of 0.33 pound of ethylbenzene feed per hour per pound of catalyst. The stream fed through the reactor is at a temperature of 1164° F. at the inlet. The catalyst bed is at a temperature of 1078° F. one-fourth of the distance from the top of the catalyst bed to the bottom, 1064° F. at the middle, 1058° F. three-fourths of the distance from the top of the catalyst bed to the bottom, and 1009° F. at the outet. The composition of the ethylbenzene feed is 0.1% benzene, 1.7% toluene, 91.4% ethylbenzene, and 6.9% styrene. The dehydrogenation product has a composition, as determined by gas chromatography, of 1.2% benzene, 3.3% toluene, 56.0% ethylbenzene, and 39.5% styrene.

It is apparent from the results of the dehydrogenation runs of Examples 10–23 that the promoted catalysts are substantially more active and effective for the dehydrogenation of ethylbenzene than conventional unpromoted catalysts. By a comparison of the results of the dehydrogenation runs of Example 23 and the comparison example, in which the conditions of the reactions were approximately the same with respect to the ethylbenzene feed to steam ratios and the composition of the ethylbenzene feed, it is evident that almost twice as much ethylbenzene is converted to styrene by the use in Example 23 of the promoted catalyst. This requires almost twice as much heat consumption. However, the drop in temperature between the inlet and outlet zones of Example 23 was less by 25° F. than that of the comparison example run which means that the exothermic methanation reaction of Example 23 provided the heat necessary for the increased production of styrene by the endothermic dehydrogenation of ethylbenzene. Additionally, the methanation reaction favors the dehydrogenation reaction by lowering the partial pressure of hydrogen produced which shifts the equilibrium of the dehydrogenation reaction to favor the increased production of styrene.

Numerous modifications of this invention which are not specifically mentioned herein will be readily apparent to those familiar with the art of dehydrogenation and methanation reactions and the catalysts which are suitable therefore and such modifications may be adopted without departing from the spirit and scope of this invention.

What is claimed is:

1. A catalyst suitable for the dehydrogenation of olefins in the presence of steam and oxides of carbon at a temperature of from about 570° F. to 1200° F. with concomitant methanation of carbon oxides consisting essentially of iron oxide, and minor amounts of an alkaline compound of an alkali metal, chromium oxide, and an oxide of a second Group VIII metal, having catalytic activity for the hydrogenation of carbon oxides to methane.

2. A catalyst according to claim 1 which contains an amount between about 5% and 30% by weight of a hydraulic cement containing free calcium oxide which is not chemically bound with aluminum or silica compounds.

3. A catalyst according to claim 1 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and an oxide of the second Group VIII metal is cobalt oxide and is 0.05% to 10% of the catalyst weight.

4. A catalyst according to claim 1 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and an oxide of the second Group VIII metal is nickel oxide and is 0.05% to 10% of the catalyst weight.

5. A catalyst according to claim 1 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and an oxide of the second Group VIII metal is ruthenium oxide and is 0.05% to 1.0% of the catalyst weight.

6. A catalyst according to claim 2 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and an oxide of the second Group VIII metal is cobalt oxide and is 0.05% to 10% of the catalyst weight.

7. A catalyst according to claim 2 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and an oxide of the second Group VIII metal is nickel oxide and is 0.05% to 10% of the catalyst weight.

8. A catalyst according to claim 2 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and an oxide of the second Group VIII metal is ruthenium oxide and is 0.05% to 1.0% of the catalyst weight.

9. A process for dehydrogenating a hydrocarbon selected from the group consisting of mono-olefins and alkylated aromatic hydrocarbons which comprises conducting a mixture of said hydrocarbon and steam at a temperature in the range of from about 570° F. to about 1200° F. and a pressure near atmospheric pressure, over a catalyst having activity for both dehydrogenation and methanation reactions, said catalyst consisting essentially of iron oxide, and minor amounts of an alkaline compound of an alkali metal, chromium oxide, and an oxide of a second Group VIII metal, whereby oxides of carbon present in the reacting mixture are hydrogenated to methane and water, the exothermic heat of the methanation reaction providing a portion of the heat requirements for the endothermic dehydrogenation reaction and reducing the partial pressure of hydrogen to drive the dehydrogenation reaction toward completion.

10. A process according to claim 9 in which the catalyst contains an amount between about 5% and 30% by weight of a hydraulic cement containing free calcium oxide which is not chemically bound with aluminum or silica compounds.

11. A process according to claim 9 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and the oxide of the second Group VIII metal is cobalt oxide and is 0.05% to 10% of the catalyst weight.

12. A process according to claim 9 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and the oxide of the second Group VIII metal is nickel oxide and is 0.05% to 10% of the catalyst weight.

13. A process according to claim 9 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and the oxide of the second Group VIII metal is ruthenium oxide and is 0.05% to 1.0% of the catalyst weight.

14. A process according to claim 10 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and the oxide of the second Group VIII metal is cobalt oxide and is 0.05% to 10% of the catalyst weight.

15. A process according to claim 10 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and the oxide of the second Group VIII metal is nickel and is 0.05% to 10% of the catalyst weight.

16. A process according to claim 10 wherein the iron oxide is 30% to 80% of the catalyst weight, the alkaline compound of an alkali metal is potassium oxide and is 5% to 40% of the catalyst weight, the chromium oxide is 0.5% to 10% of the catalyst weight, and the oxide of the second Group VIII metal is ruthenium oxide and is 0.05% to 1.0% of the catalyst weight.

References Cited

UNITED STATES PATENTS

| | | | |
|---|---|---|---|
| 2,628,969 | 2/1953 | Rottig | 252—474 XR |
| 2,870,228 | 1/1959 | Armstrong et al. | 252—474 XR |
| 3,179,707 | 4/1965 | Lee | 260—669 |
| 3,291,756 | 12/1966 | Bowman | 260—669 XR |

DELBERT E. GANTZ, *Primary Examiner.*

CURTIS R. DAVIS, *Assistant Examiner.*

U.S. Cl. X.R.

252—470, 474; 260—680